United States Patent
Caratge

(10) Patent No.: US 11,035,372 B2
(45) Date of Patent: Jun. 15, 2021

(54) PNEUMATIC CONTROLLER FOR CONTROLLING A BLEED VALVE

(71) Applicant: SAFRAN AIRCRAFT ENGINES, Paris (FR)

(72) Inventor: Antoine Marie George Caratge, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 201 days.

(21) Appl. No.: 16/374,633

(22) Filed: Apr. 3, 2019

(65) Prior Publication Data
US 2019/0309647 A1    Oct. 10, 2019

(30) Foreign Application Priority Data
Apr. 4, 2018    (FR) ........................................ 1852930

(51) Int. Cl.
| | |
|---|---|
| F04D 27/02 | (2006.01) |
| F01D 17/14 | (2006.01) |
| F02C 6/08 | (2006.01) |
| F02C 3/073 | (2006.01) |
| F01D 17/26 | (2006.01) |
| F01D 17/10 | (2006.01) |
| F04D 29/58 | (2006.01) |
| F16K 49/00 | (2006.01) |
| F16K 31/122 | (2006.01) |
| F01D 5/02 | (2006.01) |

(52) U.S. Cl.
CPC ....... *F04D 27/0215* (2013.01); *F01D 17/105* (2013.01); *F01D 17/141* (2013.01); *F01D 17/26* (2013.01); *F02C 3/073* (2013.01); *F02C 6/08* (2013.01); *F04D 27/0223* (2013.01); *F04D 29/5813* (2013.01); *F16K 31/122* (2013.01); *F16K 49/005* (2013.01); *F01D 5/022* (2013.01)

(58) Field of Classification Search
None
See application file for complete search history.

(56) References Cited

U.S. PATENT DOCUMENTS

| | | | | |
|---|---|---|---|---|
| 3,237,641 A | * | 3/1966 | Audemar | ............ F16H 61/0274 137/596.15 |
| 10,180,106 B2 | * | 1/2019 | Ribarov | ................ F04D 27/009 |

(Continued)

FOREIGN PATENT DOCUMENTS

| | | |
|---|---|---|
| EP | 3246606 A1 | 11/2017 |
| FR | 2982319 A1 | 5/2013 |

*Primary Examiner* — Ninh H. Nguyen
*Assistant Examiner* — Jason Fountain
(74) *Attorney, Agent, or Firm* — Womble Bond Dickinson (US) LLP

(57) ABSTRACT

Controller for controlling a bleed valve including a first body with an internal cavity connected to an air inlet port and an air outlet port, a second body including a chamber, a mobile member in the cavity and in the chamber, connecting the two bodies. The member is mobile between a position whereby the ports fluidly communicate and a position whereby the ports are isolated, the member further including two pistons housed in the chamber and defining in this chamber at least two spaces. The controller also includes a fluid supply for at least one of the spaces for the purpose of moving the pistons in the chamber.

9 Claims, 2 Drawing Sheets

(56) References Cited

U.S. PATENT DOCUMENTS

2008/0196773 A1* 8/2008 Franconi .............. G05D 16/166
                                                    137/492.5
2013/0115055 A1   5/2013 Mottet et al.
2017/0335775 A1* 11/2017 Ribarov ................... F02C 6/08

* cited by examiner

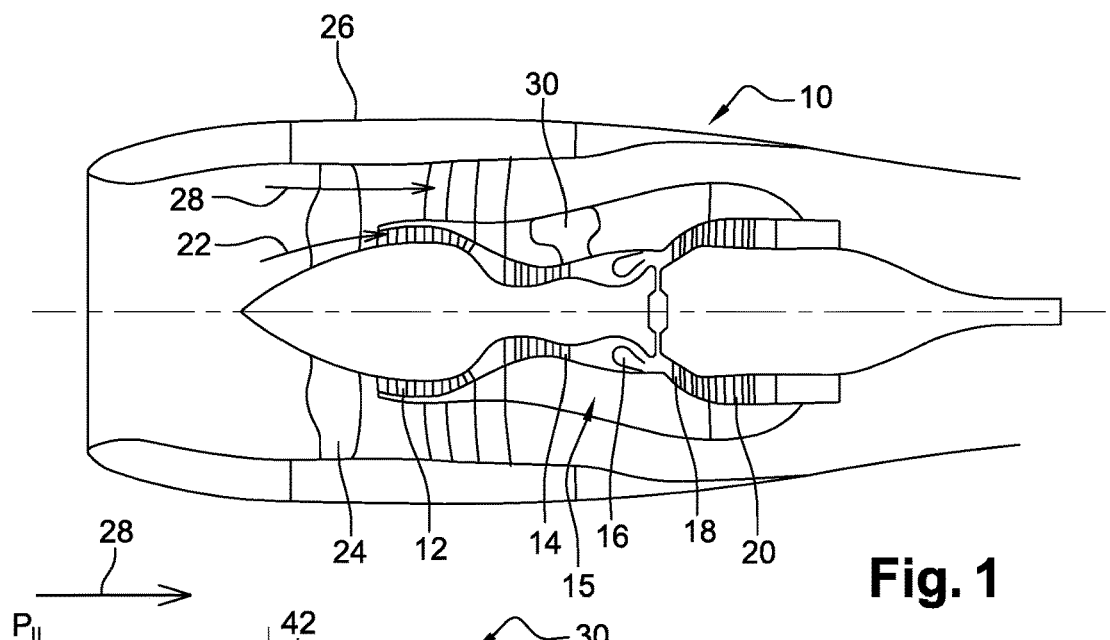
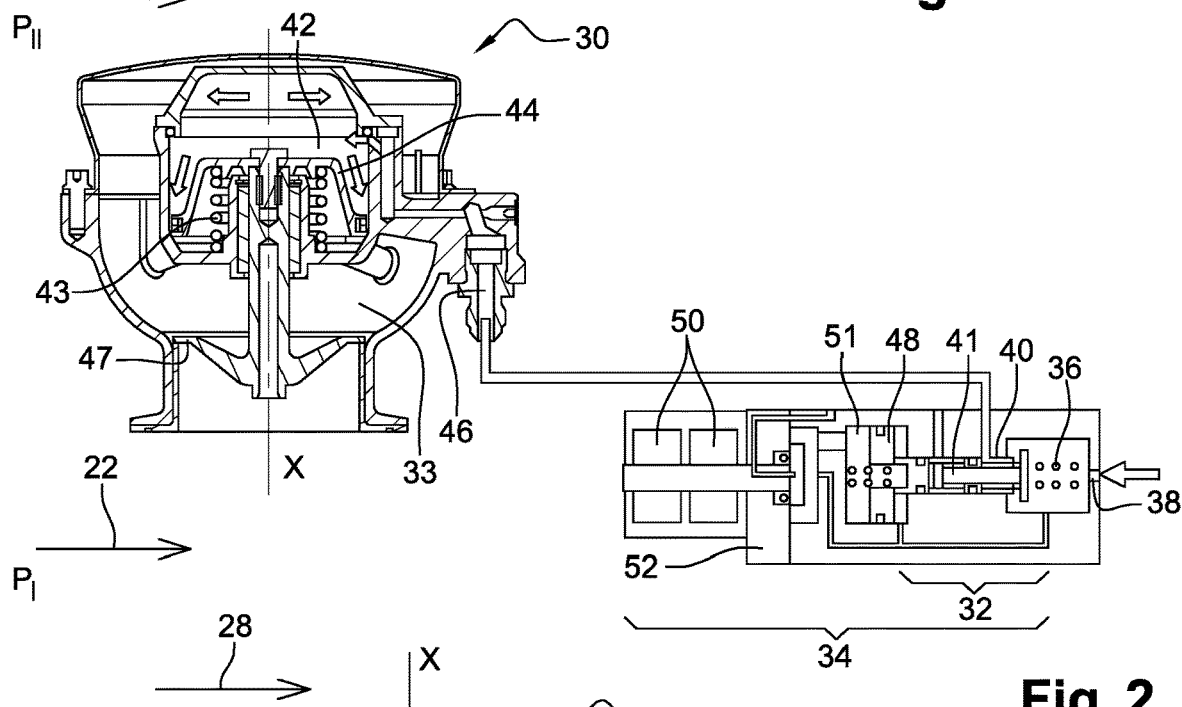
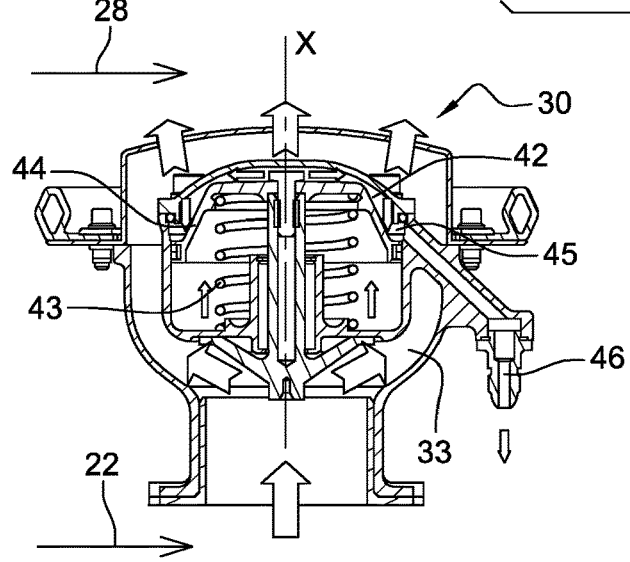
Fig. 1
Fig. 2
Fig. 3

PNEUMATIC CONTROLLER FOR CONTROLLING A BLEED VALVE

TECHNICAL FIELD

The present invention relates to a pneumatic controller, in particular for controlling a bleed valve of a turbine engine.

STATE OF THE ART

A dual-flow turbine engine comprises a flow passage for a primary flow (or hot flow) and a flow passage for a secondary flow (or cold flow). It is known to equip such a turbine engine with bleed valves, also designated by the acronym thereof, VBV (Variable Bleed Valve) or also called air valves (as they open or close air ducts). Conventionally, these are valves of the on/off-type (closed or open).

In a conventional and well-known manner, as shown in FIG. 1, such a turbojet 10 generally comprises, from upstream to downstream along the direction of flow of the gases, a low-pressure compressor 12, a high-pressure compressor 14, a combustion chamber 16, a high-pressure turbine 18 and a low-pressure turbine 20, that define a flow passage for a primary flow of gases 22 and form the central compartment 15 ("core zone") of the turbojet. In the case of a dual-flow turbojet, the turbojet further comprises a fan 24 that is surrounded by a nacelle 26 to generate a secondary flow 28 passing through an annular secondary flow passage, defined between the nacelle 26 and the central compartment 15 of the turbojet.

The bleed valves 30 are conventionally located in the central compartment ("core zone") of the turbine engine, more specifically in the proximity of a compressor, and are intended to regulate the flow of air at the inlet of the primary flow passage, in particular to limit surge risks in the compressor of the turbine engine by making it possible for the evacuation or discharge of a flow of air into the secondary flow passage.

Surging is an aerodynamic phenomenon that is well-known to a person skilled in the art and occurs in a compressor: when the pressure difference between the input and output of the compressor is too high and instabilities (called rotating stalls) appear at the level of the blades of the compressor. If this stall phenomenon is too significant, the gas flow generated in the compressor no longer pushes the gas in the right direction, and the "high-pressure" part of the compressor (the output) empties into the "low-pressure" part thereof (the input). In certain extreme cases, an inversion of the direction of flow can be observed.

This surge phenomenon reduces the performance of compressors and can also cause damage to the blades of the compressor.

Surging is one of the most serious problems that a pilot has to face, as it generally occurs when the aircraft takes off.

Moreover, in the event of water accidentally penetrating the primary flow passage, in particular in the form of rain or hail, or also if various debris that are likely to affect the functioning of the turbine engine penetrate the primary flow passage, these valves make it possible to collect this water or debris that are centrifuged and routed towards the secondary flow passage to be ejected.

Thus, each aircraft engine is provided with systems for discharging the compressor in the form of valves that are conventionally actuated by hydraulic or pneumatic actuators, such as those shown for example in documents EP 3 246 606 A1 and FR 2 982 319. Each pneumatic actuator used in these discharge systems is coupled to a pneumatic controller having one or more solenoid valves. The solenoid valves of the pneumatic controller, depending on whether they are open or not, make it possible (or not) for the transmission of the command pressure to the actuator of the bleed valve, and from there, control the opening or closing of the bleed valve. It is important here to make a clear difference between the actuator of the bleed valve (the piston that moves the valve) and the actuator of the pneumatic controller, which makes it possible to provide the valve with control air. It is possible for a pneumatic controller not to have an actuator and only to have a solenoid valve. This configuration is rare as the maximum flow of control air in this case is highly limited, but it nonetheless exists in the state of the art.

Each solenoid valve conventionally comprises one or two electrical coils and these coils have a maximum heat resistance of 200-230° C. because of the insulating material of the winding (which is degraded when this maximum temperature is exceeded). This is a constraint in terms of installing the pneumatic controller, as it cannot be installed in the central compartment and has to be installed in the nacelle. Moreover, the air coming into the pneumatic controller cannot exceed a certain temperature. The air used to supply the pneumatic controller is conventionally taken from the primary air flow (typically downstream from the HP compressor in the direction of the air flow through the engine) and therefore is much greater than 200° C. under normal operating conditions of the turbine engine. The air taken from the primary flow must therefore be cooled by using, for example, a heat exchanger or an intentionally long duct.

However, air cooling is always accompanied by condensation of water vapour (partial or total) present in the air taken at the level of the compressor. Moreover, owing to the altitude and negative temperatures (even on the ground in certain countries, in winter), the environment is conducive to icing. When water icing occurs, the pneumatic systems become non-operational (blocking of galleries or of the translational movement of pistons) and must therefore be prevented, conventionally, by drain holes.

The present invention proposes a technical solution to this problem.

PRESENTATION OF THE INVENTION

For this purpose, the present invention proposes a pneumatic controller for a turbine engine, in particular for controlling a bleed valve of this turbine engine, having:
  a first body comprising an internal cavity connected to an air inlet port and an air outlet port,
  a second body comprising a chamber,
  a member connecting the first and second bodies, arranged, on the one hand, in the internal cavity and, on the other hand, in the chamber, said member being mobile in the internal cavity and in the chamber, connecting the two bodies, said member being mobile between a position where said ports fluidly communicate and a position where said ports are isolated, said mobile member comprising at least one piston housed in the chamber and defining in this chamber at least two spaces,
  fluid supply means for at least one of said spaces for the purpose of moving the piston in said chamber,
  characterised in that said means are liquid supply means, and in that the two bodies are separated by an air cavity.

The air coming into the controller does not have to be cooled upstream, as the controller comprises fluid supply means that maintain the coils at the required temperature even inside the controller. The air coming into the controller is thus a lot less charged with condensed water. Moreover, the separation of the two bodies prevents liquid from penetrating into the first body.

The controller according to the invention can also have one or more of the following characteristics, taken individually or in combination:
- said supply means can be fuel or oil supply means,
- the mobile member can comprise, in the chamber, two pistons and a central distributor arranged between the pistons, coaxially with the latter,
- the two pistons and the central distributor can be provided with orifices to make it possible for a continuous circulation of the liquid between said spaces and the chamber,
- each space of the chamber fluidly communicates with a liquid supply orifice,
- each space can be configured to be supplied either with high-pressure liquid, or with low-pressure liquid, so as to cause the at least one piston to slide in the chamber,
- the controller can comprise a solenoid valve with a mobile core, the solenoid valve being connected by the fluid supply means to each of the orifices and configured to supply high- or low-pressure liquid to one or the other of the spaces.
- the two bodies can be separated by a double seal formed by the air cavity and an isolation cavity, the air cavity being located within the first body and the isolation cavity being located between the two bodies,
- the two bodies can be separated by a drain.

The invention also relates to a discharge device for a turbine engine comprising a controller such as described above, and of which the air outlet port is connected to a bleed valve.

DESCRIPTION OF THE FIGURES

The invention will be better understood, and other details, characteristics and advantages of the invention will become clearer upon reading the following description, provided by way of an example and not limited thereto, and with reference to the appended drawings, wherein:

FIG. 1 is a schematic and axial cross-sectional view of a dual-flow turbojet,

FIG. 2 is a schematic, cross-sectional view of a controller and an associated bleed valve in the closed position, according to the state of the art, FIG. 3 is a schematic, cross-sectional view of a bleed valve in the open position.

DETAILED DESCRIPTION

Figure 4A:
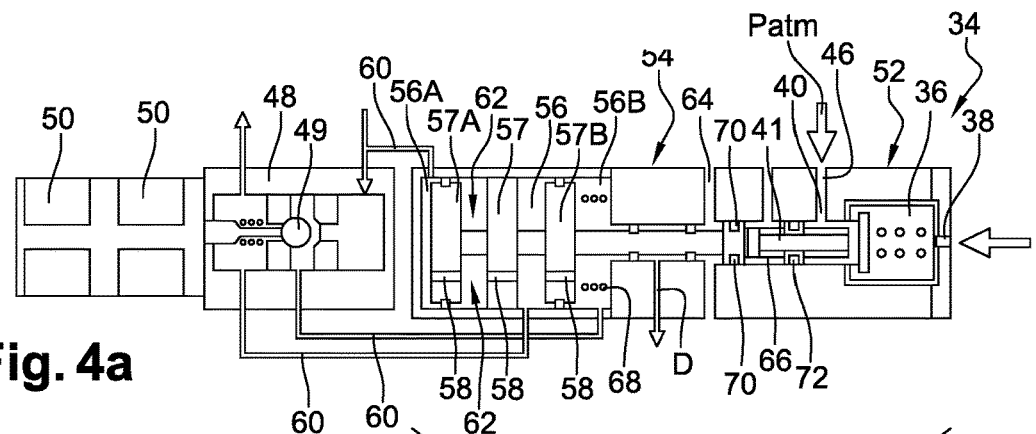
FIGS. 4a and 4b are schematic, cross-sectional views of a controller according to the invention, respectively with an open and a closed valve, according to a first embodiment.

FIG. 1 has been described above.

As shown in FIGS. 2 and 3, a bleed valve 30 is conventionally an on/off valve intended to be either open or closed.

In the state of the art shown in FIG. 2, each bleed valve 30 is actuated by an internal fluid-driven actuator, in this case a pneumatic actuator, and controlled by a command actuator 32 that is part of a fluid controller 34, which is a pneumatic controller in FIG. 2. It is important to distinguish the internal actuator of the valve (the piston thereof) and the command actuator 32 of the controller 34, which provides (or not) control air. In FIG. 2, the valve 30 is closed and the primary 22 and secondary 28 flows are not connected.

The command actuator 32 of the controller 34 comprises a body comprising an internal cavity 36 connected to an air inlet port 38 and an air outlet port 40. The air outlet port 40 is connected to the bleed valve 30. The command actuator 32 also comprises a mobile member 41, which, in FIG. 2, is a piston, mobile in translation, opening or closing the internal cavity 36. The mobile member 41 is mobile between a position whereby the two ports 38, 40 communicate fluidly (causing the bleed valve 30 to close, as shown in FIG. 2), and a position whereby the ports 38, 40 are isolated (causing the bleed valve 30 to open). The port 40 then fluidly communicates with the ambient pressure.

As shown in FIG. 2, the valve 30 has a generally cylindrical shape about a revolution axis X extending in a substantially radial direction with respect to the longitudinal axis of the turbine engine 10. The cylinder comprises two separate cavities:
- a through-cavity 33, that opens at both opposite ends of the cylinder, making it possible to connect the primary and secondary flow passages 22, 28 and wherein is housed a piston 44 moveable in translation along the axis X,
- a closed cavity 42 forming the upper chamber of the piston.

The head 47 of this piston closes, as necessary, the valve 30 by cooperating with a bottleneck of the through-cavity 33. The rod of the piston 44 is surrounded by a return spring 43, which, when it is released, opens the valve 30. The closed cavity 42 has an opening 45 opening onto a channel 46 connected to the air outlet port 40 of the controller 34. When the mobile member 41 of the command actuator 32 is in a position whereby the two ports 38, 40 fluidly communicate, pressurised air (control air) is sent in the channel 46 and there is a control pressure PC in the closed cavity 42. This pressure PC being greater than the pressure PI of the primary flow passage 22 (and also greater than the pressure PII of the secondary flow passage 28), the valve 30 closes and remains in a closed position. This configuration is shown in FIG. 2.

When the mobile member 41 is in a position where said ports 38, 40 are isolated, no more control air is sent in the channel 46 and the closed cavity 42 is at Patm. As the pressure Patm is less than pressures PI and PII, the spring 43 is released and the valve 30 opens and is maintained in an open position. This configuration is shown in FIG. 3.

The command actuator 32 is controlled by the controller 34. In the case of the present invention, the command actuator 32 and the controller 34 form a one-piece device. The controller 34 comprises at least one electrical coil 50 and a mobile cup 39, thereby forming a solenoid valve. This solenoid valve makes it possible to set, in a conventional and known manner, the mobile member 48, and therefore the mobile member 41 of the command actuator 32, in motion through the change of pressure equilibriums in the cavity 51 via the fluid ducts.

As mentioned above, with a pneumatic solenoid valve within a pneumatic controller 34, the distance between the bleed valve 30 and the controller 34 is significant and can cause problems.

Thus, the present invention proposes replacing the purely-pneumatic controller 34 with a hydropneumatic controller 34.

Below, items with functions similar to the elements described above are likely to have the same reference numbers, to facilitate reading.

Figure 4B:
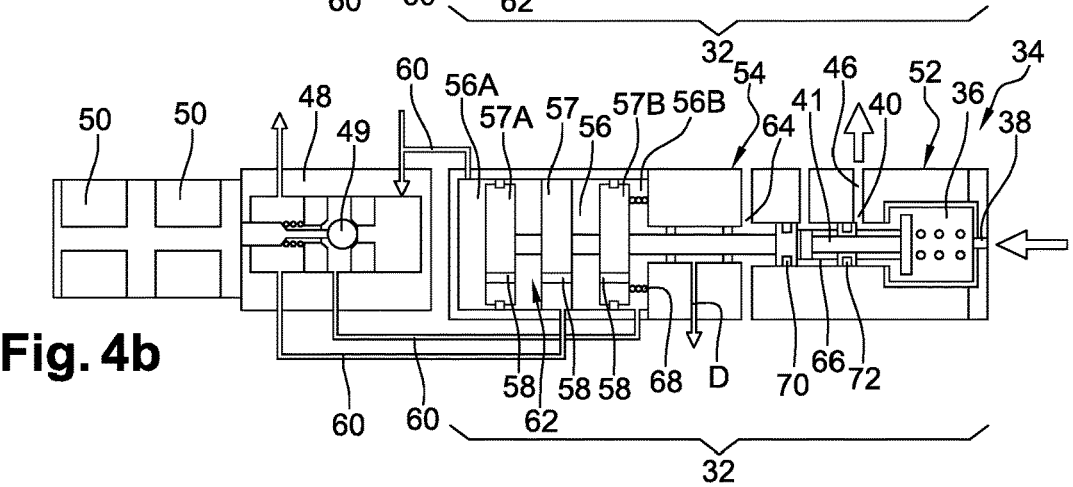

For this purpose, as shown in FIGS. 4a and 4b, the controller 34 comprises a hydraulic solenoid valve (the mobile ball-rod-type core 49 makes it possible (or not) for the circulation of liquid(s)) controlling a hybrid liquid/air-driven actuator 32. The controller 34 is thus a hydropneumatic controller.

Thus, the controller 34 according to the invention comprises, in the actuating part 32 thereof, two separate bodies: a first body 52, called pneumatic body, and a second body 54, called hydraulic body. Similarly, to the actuator according to the state of the art described above, the first body 52 comprises an internal cavity 36 connected to an air inlet port 38 and to an air outlet port 40.

The second body 54 comprises a chamber 56 and it is connected to the second body 52 via a mobile member 41. The mobile member 41 extends from the chamber 56 to the internal cavity 36 and is mobile in translation between a position whereby the ports 38, 40 communicate fluidly and a position whereby the ports 38, 40 are isolated. This mobile member 41 moreover comprises at least one piston (two, in this case) 57A, 57B housed in the chamber 56 of the second body 54 and at least another piston (a third one, in this case) housed in the internal cavity 36. The mobile member 41 defines, in this chamber 56, at least two spaces 56A, 56B. More specifically, the mobile member 41 is provided with a first and a second piston 57A, 57B and a central distributor 57, all housed in the chamber 56 of the second body 54. The mobile member 41 thus defines four spaces: a first space 56A extending between a first end of the chamber 56 and the first piston 57A, a second space extending between the first piston 57A and the central distributor 57, a third space extending between the central distributor 57 and the second piston 57B and a fourth space 56B of the chamber 56.

Among the four spaces defined in the chamber 56, three are provided with fluid supply means 60 for moving the pistons 57A, 57B and the central distributor 57 in the chamber 56. These means 60 are liquid supply means, in this case supplying fuel 62.

Each piston 57A, 57B and the central distributor 57 are provided with orifices 58 that that make it possible for a continuous and calibrated circulation of the fuel 62 contained in the chamber 56.

The orifices 58 make it possible for the continuous circulation of the fuel 62 regardless of the position of the mobile member 41, in order to make it possible for thermal stabilisation by the fuel 62 of the solenoid valve 48 and the actuator 32, and also to prevent coking of the fuel 62 (due to the absence of a hot spot).

The fuel 62 could be replaced by oil.

In order to prevent the fuel 62 of the hydraulic body 54 from penetrating the internal cavity 36 of the pneumatic body 52, the mobile member 41 passes through an intermediate cavity located at the end of the body 54, upstream from the body 52 and provided with a drain D. Thus, if fuel 62 is driven by the mobile member 41 out of the hydraulic body 54, the fuel 62 is collected in the drain and does not penetrate the pneumatic body 52.

Furthermore, the hydraulic body 54 comprising the fuel 62 is separated from the pneumatic body 52 by a double seal: a first isolation cavity 64 located between the drain D and the pneumatic body 52 causing a physical separation of the two bodies 52 and 54 and a second isolation cavity 66, within the pneumatic body 52 brought to Patm via an opening onto the outside environment.

As indicated above, each space 56A, 56B is provided with a liquid supply orifice. These orifices supply each space 56A, 56B independently, via fluid supply means 60.

The supply of the space 56B can thus be conducted with high-pressure fuel 62, or with low-pressure fuel 62, independently, so as to cause the pistons 57A, 57B to slide in the chamber 56. The supply of the space 56A can is conducted with high-pressure fuel 62, independently, so as to cause the pistons 57A, 57B to slide in the chamber 56.

The solenoid valve of the controller 34 is here a conventional valve comprising a mobile ball-rod-type core 49 and comprising two compartments: one containing high-pressure fuel 62 and the other containing low-pressure fuel 62. The solenoid valve is connected, by fluid connection means 60, to each of the orifices of the spaces 56A, 56B of the chamber 56, as well as to the evacuation orifice of the distributor 57.

According to the current generated by the coils 50, the solenoid valve manages the input of fuel 62 at high or low pressure in the various spaces 56A, 56B of the chamber 56 of the hydraulic body 54. The supply of high-pressure or low-pressure fuel 62 to the space 56B is determined by the solenoid valve of the controller 34.

The input of high-pressure or low-pressure fuel 62 into the various spaces 56A, 56B of the chamber 56 moves the pistons 57A, 57B. This causes a translational movement of the mobile member 41 and makes it possible (or not) to send control air from the air inlet port 38 towards the bleed valve 30 and the duct 46 thereof (not shown) via the air outlet port 40 of the pneumatic body 52.

In FIG. 4a, the bleed valve 30 is controlled open (deactivated coils 50). Indeed, the mobile member 41 is in a position whereby the ports 38, 40 are isolated and the control air entering through the air inlet port 38 is blocked in the internal cavity 36. The mobile member 41 is maintained in this position by the spring of the internal cavity 36 that pushes back the mobile member 41 by the equilibrium of pressures exerted by the fuel 62 in the various spaces 56A, 56B of the chamber 56: the solenoid valve 48 is in an open position and high-pressure fuel 62 is sent into the spaces 56A, 56B of the chamber 56, while the remainder of the chamber 56 is filled with low-pressure fuel 62.

When the coils 50 are activated (as seen in FIG. 4b) the mobile core 49 is moved, the solenoid valve of the controller 34 closes, and the space 56B of the chamber 56 is suddenly supplied with low-pressure fuel 62, while the space 56A continues to be supplied with high-pressure fuel 62. The set of pressures exerted by the fuel 62 makes it possible to overcome the force of the spring 68 to compress it: this causes a sliding of the mobile member 41 and it adopts a position whereby the air inlet and outlet ports 38, 40 of the internal cavity 36 of the pneumatic body 52 fluidly communicate. The control air can therefore enter into the channel 46 and close the bleed valve 30 (not shown).

In terms of operating safety, the bleed valve 30 remains in an open position ("fail-safe" position) in the event of:
  loss of electrical control,
  loss of pressure of the high-pressure fuel 62,
  loss of pressure of the supply of control air,
  breakage of the rod of the mobile core 49 of the solenoid valve.

In addition, upon engine shutoff, the bleed valve 30 is kept open by the spring 68 housed in the space 56B of the chamber 56, because at engine shutoff, the static pressure exerted by the fuel 62 in the controller 34 is the same throughout the controller 34.

Figure 5A:
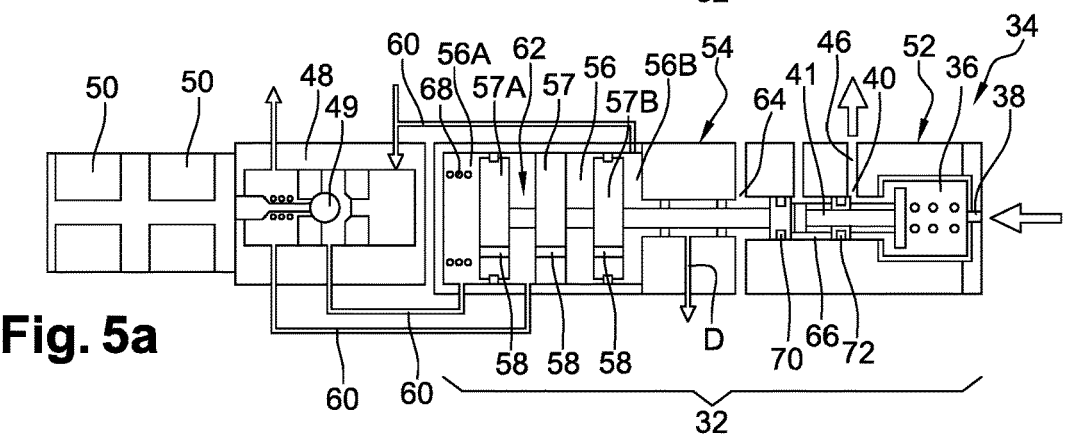
FIGS. 5a and 5b are schematic, cross-sectional views of a controller according to the invention, respectively with an open and a closed valve, according to a second embodiment, intended for an inverted-command bleed valve.
Figure 5B:
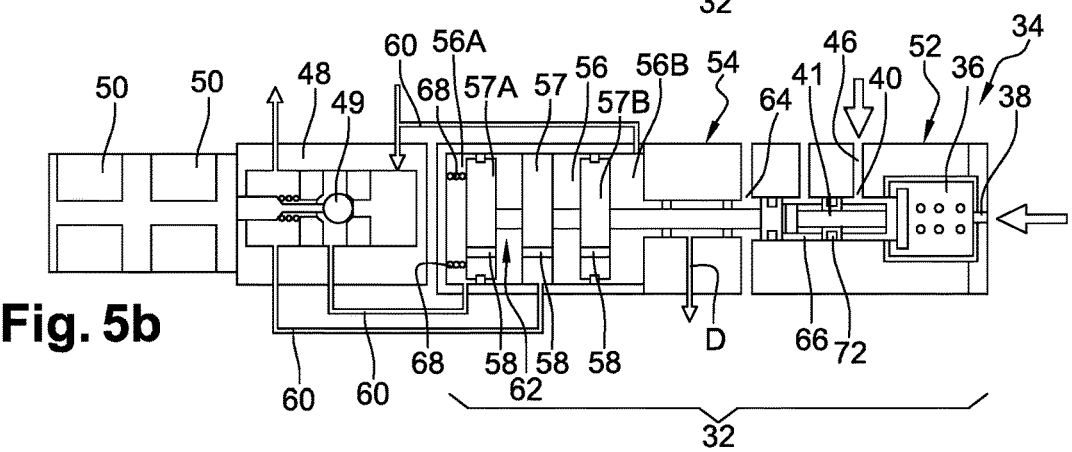

FIGS. 5a and 5b show an inverted embodiment, wherein an inverted-control bleed valve 30 (not shown) is open when the mobile member 41 is in a position whereby the air inlet and outlet ports 38, 40 communicate fluidly. In this case, the inverted-control valve 30 is opened by the input of control air in the channel 46.

Moreover, the significant stresses exerted in the hydraulic body 54 make it possible for the use of polymer seals 70, 72 around the piston of the pneumatic body 52, thereby limiting the air leakage to a minimum and increasing the overall efficiency of the turbine engine 10.

Moreover, in a "cruise" flight configuration (bleed valve 30 closed, see FIGS. 4b and 5a), only one of the seals 70, 72 sees a pressure difference (the one closest to the air outlet in the pneumatic body 52), and the resulting leaks are therefore minimal.

In an embodiment (not shown), it can be considered to not separate physically the two bodies 52, 54, which makes possible the removal of the seals 70, 72. In this configuration, the isolation cavity 64 is internal and also is used for the venting of the piston 41 of the bleed valve when it is open.

The presence of a continuous flow of fuel 62 (or of oil), with a maximum temperature of around 150° C., in the close proximity of the coils 50, makes it possible to place this hydropneumatic controller 34 in the central compartment of the turbine engine 10. By conduction, the coils 50 have a temperature that is lower than the technical limit thereof of 200-230° C. A thermal cover can however prove to be useful to limit radiation coming from the engine casing.

To summarise, the present invention makes it possible:
- to have an on/off bleed valve 30 (which is therefore simple, inexpensive and reliable), compatible with a design brief of a bleed valve 30 (open "fail-safe" position),
- to have a reliable controller 34, as it is much less sensitive to icing and control air pollution problems,
- to achieve air leaks that are limited by the use of polymer seals in the pneumatic body 52 (unreliable carbon seals no longer having to be used),
- to position the controller in the central compartment of the turbine engine 10 (as it is thermally stabilised by the fuel 62 that passes through it), and therefore closer to the bleed valves 30 of the turbine engine 10, which makes it possible for significant weight savings.

In addition, with the hydraulic body 54 transmitting significant forces to the pneumatic body 52, the latter is subject to reduced risks of mechanical blocking (due to ice or metallic particles stuck around the seals).

The invention claimed is:

1. A pneumatic controller for a turbine engine, in particular for controlling a bleed valve of this turbine engine, having:
a first body comprising an internal cavity connected to an air inlet port and an air outlet port,
a second body comprising a chamber,
a member connecting the first and second bodies, arranged, on one hand, in the internal cavity and, on an other hand, in the chamber, said member being mobile in the internal cavity and in the chamber, connecting the two bodies, said member being mobile between a position where said ports fluidly communicate and a position where said ports are isolated, said mobile member comprising at least one piston housed in the chamber and defining in this chamber at least two spaces,
fluid supply means for at least one of said spaces for the purpose of moving the piston in said chamber,
wherein said fluid supply means are liquid supply means, and in that the two bodies are separated by an air cavity, and
wherein the mobile member comprises, in the chamber, two pistona and a central distributor arranged between the pistona, coaxially therewith.

2. The controller according to claim 1, wherein said liquid supply means are for supplying fuel oil.

3. The controller according to claim 1, wherein the two pistons and the central distributor are provided with orifices so as to make it possible for a continuous circulation of the liquid between said spaces and the chamber.

4. The controller according to claim 1, wherein each space and the chamber fluidly communicate with an orifice for the supply of liquid.

5. The controller (34) according to claim 1, wherein each space is configured to be supplied either with high-pressure liquid, or with low-pressure liquid, so as to cause the at least one piston to slide in the chamber.

6. The controller according to claim 5, comprising a solenoid valve with a mobile core, the solenoid valve being connected by the fluid supply means to each of the orifices, and configured to supply high- or low-pressure liquid to one or the other of the spaces.

7. The controller according to claim 1, wherein the two bodies are separated by a double seal formed by the air cavity and an isolation cavity, the air cavity being located within the first body and the isolation cavity being located between the two bodies.

8. The controller according to claim 1, wherein the two bodies are separated by a drain.

9. A discharge device for the turbine engine comprising a controller according to claim 1, of which the air outlet port is connected to a bleed valve.

* * * * *